United States Patent
Anderson

(10) Patent No.: US 11,930,249 B2
(45) Date of Patent: Mar. 12, 2024

(54) SINGLE MAC DEVICE FEEDING MULTIPLE PHYSICAL LAYER DEVICES

(71) Applicant: Charter Communications Operating, LLC, St. Louis, MO (US)

(72) Inventor: Philip Anderson, Centennial, CO (US)

(73) Assignee: CHARTER COMMUNICATIONS OPERATING, LLC, St. Louis, MO (US)

( * ) Notice: Subject to any disclaimer, the term of this patent is extended or adjusted under 35 U.S.C. 154(b) by 168 days.

(21) Appl. No.: 17/313,537

(22) Filed: May 6, 2021

(65) Prior Publication Data
US 2022/0060782 A1 Feb. 24, 2022

Related U.S. Application Data

(60) Provisional application No. 63/106,968, filed on Oct. 29, 2020, provisional application No. 63/069,701, filed on Aug. 24, 2020.

(51) Int. Cl.
*H04N 21/443* (2011.01)
*H04N 21/61* (2011.01)
*H04N 21/643* (2011.01)

(52) U.S. Cl.
CPC ....... *H04N 21/443* (2013.01); *H04N 21/6118* (2013.01); *H04N 21/643* (2013.01)

(58) Field of Classification Search
CPC ............. H04N 21/443; H04N 21/6118; H04N 21/643; H04N 21/6168; H04N 7/17309; G06F 8/65; H04L 69/323; H04L 12/2801; H03F 3/189
See application file for complete search history.

(56) References Cited

U.S. PATENT DOCUMENTS

| | | | |
|---|---|---|---|
| 7,792,963 B2 | 9/2010 | Gould | |
| 2003/0056217 A1 | 3/2003 | Brooks | |
| 2006/0130107 A1 | 6/2006 | Gonder et al. | |
| 2006/0256799 A1* | 11/2006 | Eng | H04L 12/2801 370/401 |
| 2007/0217436 A1 | 9/2007 | Markley | |
| 2009/0248794 A1 | 10/2009 | Helms | |
| 2010/0313236 A1 | 12/2010 | Straub | |

(Continued)

OTHER PUBLICATIONS

CableLabs, "Data-Over-Cable Service Interface Specifications Flexible MAC Architecture FMA MAC Manager Interface Specification CM-SP-FMA-MMI-I01-200930." Sep. 2020. pp. 1-22.

(Continued)

*Primary Examiner* — Vinncelas Louis
(74) *Attorney, Agent, or Firm* — Otterstedt & Kammer PLLC

(57) ABSTRACT

A network communications node includes a local processor, a first remote physical device (RPD), and at least a second RPD all contained in a node housing. The local processor receives a first signal on a logical link control layer and transforms it to a second signal on a medium access control (MAC) layer. The first and second RPDs receive the second signal and respectively convert it to third and fourth signals on a physical layer. The two RPDs implement different communication protocols. Amplification for the RPDs occurs mostly outside the node housing. The node is upgraded by software patching the local processor or by physically swapping one or more of the RPDs.

15 Claims, 10 Drawing Sheets

(56) References Cited

U.S. PATENT DOCUMENTS

2015/0052573 A1* 2/2015 Schemmann ........... H03F 3/189
725/127
2020/0145323 A1* 5/2020 Finkelstein ........... H04L 69/323

OTHER PUBLICATIONS

CableLabs, "Data-Over-Cable Service Interface Specifications Flexible MAC Architecture Flexible MAC Architecture (FMA) System Specification CM-SP-FMA-SYS-I01-200930." Sep. 2020. pp. 1-168.
CableLabs, "Data-Over-Cable Service Interface Specifications Flexible MAC Architecture FMA PacketCable™ Aggregator Interface Specification CM-SP-FMA-PAI-I01-200930." Sep. 2020. pp. 1-22.
CableLabs, "Data-Over-Cable Service Interface Specifications DCA—MHAv2 Remote Out-of-Band Specification CM-SP-R-OOB-I12-200323." Mar. 2020. pp. 1-65.
CableLabs, "Data-Over-Cable Service Interface Specifications DCA—MHAv2 Remote DOCSIS Timing Interface CM-SP-R-DTI-I08-200323." Mar. 2020. pp. 1-44.
CableLabs, "Data-Over-Cable Service Interface Specifications DCA—MHAv2 Generic Control Plane Specification CM-SP-GCP-I05-200323." Mar. 2020. pp. 1-30.
CableLabs, "Data-Over-Cable Service Interface Specifications DCA—MHAv2 Remote PHY OSS Interface Specification CM-SP-R-OSSI-I14-200421." Apr. 2020. pp. 1-321.
CableLabs, "Data-Over-Cable Service Interface Specifications MHAv2 Remote Upstream External PHY Interface Specification CM-SP-R-UEPI-I13-201207." Dec. 2020. pp. 1-57.
CableLabs, "Data-Over-Cable Service Interface Specifications MHAv2 Remote Downstream External PHY Interface Specification CM-SP-R-DEPI-I15-201207." Dec. 2020. p. 1-113.
CableLabs, "Data-Over-Cable Service Interface Specifications MHAv2 Remote PHY Specification CM-SP-R-PHY-I15-201207." Dec. 2020. pp. 1-463.
Wikipedia, "Medium access control." May 2020. pp. 1-4.
Intel Corp. "Solution Brief: The Cable Access Node of the Future is Intelligent, Modular, and Scalable." Aug. 2018. pp. 1-5.
SCTE-ISBE, "Generic Access Platform (GAP)." Jan. 2021. pp. 1-8.

* cited by examiner

SINGLE MAC DEVICE FEEDING MULTIPLE PHYSICAL LAYER DEVICES

CROSS REFERENCE TO RELATED APPLICATION

The present application is a non-provisional of U.S. Provisional Application 63/069,701, "SINGLE MAC DEVICE FEEDING MULTIPLE PHYSICAL LAYER DEVICES," which was filed 24 Aug. 2020, hereby incorporated by reference in its entirety for all purposes. The present application is also a non-provisional of U.S. Provisional Application 63/106,968, "SINGLE MAC DEVICE FEEDING MULTIPLE PHYSICAL LAYER DEVICES," which was filed 29 Oct. 2020, hereby also incorporated by reference in its entirety for all purposes.

FIELD OF THE INVENTION

The present invention relates generally to electrical, electronic, and computer arts, and more particularly relates to networked distribution of data.

BACKGROUND OF THE INVENTION

Presently, data over cable service interface specification (DOCSIS) is a prevailing industry standard for providing high-bandwidth data transfer (e.g., Internet access) via legacy hybrid fiber-coaxial (HFC) infrastructure. DOCSIS addresses primarily the "physical" and "data link" layers of the seven-layer Open Systems Interconnection (OSI) communication model. The "physical" layer often is referred to as PHY while the "data link" layer includes medium/media access control ("MAC") software and logical link control ("LLC") software. The MAC software interfaces the LLC software with the PHY device. Ideally, MAC software provides an interface so that the LLC software can be agnostic to PHY device choices, i.e., any LLC sublayer (and higher layers) may be used with any MAC and PHY. Today, the MAC block typically is integrated with the PHY device within a single package as a Remote MacPhy Device (RMD). The physical layer of the OSI model (generation of the signals themselves) is moved out into the field with Remote-Phy.

A Remote MacPhy Device (RMD) implements the Media Access Control (MAC) layer and the Physical (Phy) layer of the coaxial-based broadband network typically used within the Cable industry. IP traffic headed to a customer from the cable service provider (download traffic) is sent to the RMD and the RMD converts the IP traffic into Radio Frequency (RF) signals that then are forwarded to the customer. At the customer side, a Cable Modem at the consumer premises converts the download traffic from RF back to IP and converts traffic sent by the consumer to the service provider (upload traffic) from IP to RF.

The Generic Access Platform (GAP) is a housing that supports standard mounting mechanisms and standard interfaces so a wide range of hardware packages can be interchangeably used within the housing. There is a PCI Express (PCIe) bus backplane to interconnect hardware packages and there is also an option for a local processor mounted to the backplane. The hardware packages in the GAP may connect, for example, to the coaxial portion of an HFC network.

The few current implementations of an RMD, as shown for example in FIG. 7, implement both the MAC layer and the Phy Layer at uplink and downlink sides, using one or more integrated circuit (IC) devices in the form of an ASIC or "system-on-a-chip" (SoC). Such an RMD 700 includes a MAC-layer device 702 that converts Ethernet protocol (PHY layer) to and from logical link layer protocol, and a PHY-layer device 704 that converts logical link protocol to and from a coaxial cable protocol (PHY layer). A problem with this implementation is that, for an RMD that supports multiple downlinks/service groups 706a, 706b, 706c, each service group must have the same set of features. For example, if the chipset only supports a DOCSIS 3.1 downlink, none of the service groups ports on the downlink RMD 704 will be able to support any DOCSIS 4.0 features. If the chipset supports DOCSIS 4.0 1.8 GHz, but not DOCSIS 4.0 FDX, the operator will be unable to support DOCSIS 4.0 FDX on any of the downlink ports, even if it is advantageous to do so. Lastly, if an operator has to switch to an RMD that uses another chipset supplier to obtain needed Phy layer features, the resultant MAC layer implementation may not work in the desired fashion.

SUMMARY OF THE INVENTION

Techniques are provided for a single MAC device feeding multiple physical layer devices, which, in one or more embodiments, is capable of upgrading one or more of the physical layer devices without interrupting operation of the single MAC device and the other physical layer devices that it feeds.

According to an aspect of the invention, a method for operating a network communication node includes enclosing a local processor, a first remote physical device (RPD), and a second RPD within a generic access platform (GAP) node housing of the network communication node; the local processor receiving a first signal on a logic link control (LLC) layer from a head end receiver outside the node housing and transforming the first signal to a second signal on a medium access control (MAC) layer; the local processor forwarding the second signal to the first RPD, which is adapted to implement on a physical (PHY) layer a first communication protocol; and the local processor forwarding the second signal to the second RPD, which is adapted to implement on the PHY layer a second communication protocol that is different than the first communication protocol.

According to another aspect, a network communication node apparatus includes a generic access platform (GAP) node housing; a local processor that is enclosed in the node housing and adapted to receive a first signal on a logical link control (LLC) layer and to convert the first signal to a second signal on a medium access control (MAC) layer; a first remote physical device (RPD) that is enclosed in the node housing, connected in communication with the local processor to receive the second signal on the MAC layer, and adapted to implement a first communication protocol that converts the second signal to a third signal on a physical (PHY) layer; and a second RPD that is enclosed in the node housing, connected in communication with the local processor to receive the second signal on the MAC layer, and adapted to implement a second communication protocol that is different than the first communication protocol and converts the second signal to a fourth signal on the PHY layer.

According to another aspect, a method for upgrading a network communications node includes retaining a local processor in a generic access platform (GAP) node housing, wherein the local processor is adapted by software to receive a first signal on a logical link control (LLC) layer and to convert the first signal to a second signal on a medium access control (MAC) layer; retaining a first remote physical device (RPD) in the node housing, wherein the first RPD is connected in communication with the local processor to receive the second signal on the MAC layer, and is adapted to implement a first communication protocol that converts the second signal to a third signal on a physical (PHY) layer; sending the second signal from the local processor to the first RPD on the MAC layer; removing a second RPD from the node housing, wherein the second RPD was connected in communication with the local processor to receive the second signal on the MAC layer, and was adapted to implement a second communication protocol that was different than the first communication protocol and converted the second signal to a fourth signal on the PHY layer; replacing a third RPD for the second RPD, wherein the third RPD becomes connected in communication with the local processor to receive the second signal on the MAC layer, and is adapted to implement a third communication protocol that is different than the second communication protocol and converts the second signal to a fifth signal on the PHY layer; and sending the second signal from the local processor to the third RPD on the MAC layer.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of an article of manufacture including a machine-readable medium that contains one or more programs which when executed implement one or more method steps set forth herein; that is to say, a computer program product including a tangible computer readable recordable storage medium (or multiple such media) with computer usable program code for performing the method steps indicated. Furthermore, one or more embodiments of the invention or elements thereof can be implemented in the form of an apparatus including a memory and at least one processor that is coupled to the memory and operative to perform, or facilitate performance of, exemplary method steps.

Techniques of the present invention can provide substantial beneficial technical effects. For example, one or more embodiments provide one or more of:

Ability to upgrade one or more outputs of a network node without replacing the entire node.

Ability to upgrade one output of a network node without taking the other outputs of the node offline.

These and other features and advantages of the present invention will become apparent from the following detailed description of illustrative embodiments thereof, which is to be read in connection with the accompanying drawings.

DETAILED DESCRIPTION OF PREFERRED EMBODIMENTS

Initially, the complete disclosure of United States Patent Application Publication 2008/0134165 of Anderson et al. entitled "Methods and apparatus for software provisioning of a network device," published on Jun. 5, 2008, is expressly incorporated herein by reference in its entirety for all purposes.

Figure 1:
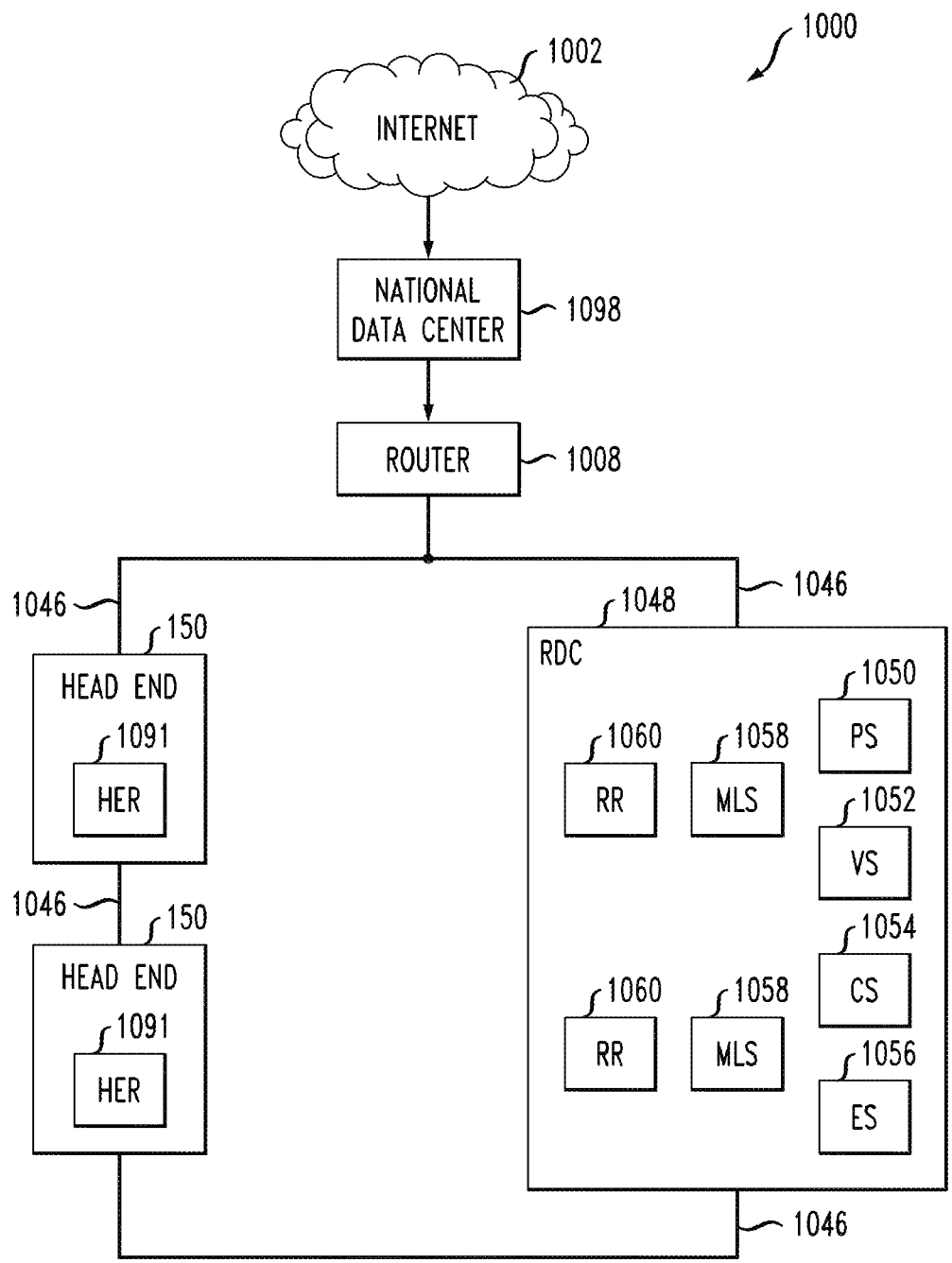
FIG. 1 is a block diagram of an exemplary embodiment of a system, within which one or more aspects of the invention can be implemented.

FIG. 1 shows an exemplary system 1000, according to an aspect of the invention. System 1000 includes a regional data center (RDC) 1048, and one or more divisions, represented by division head ends 150. RDC 1048 and head ends 150 are interconnected by a network 1046; by way of example and not limitation, a dense wavelength division multiplex (DWDM) network. Elements 1048, 150 on network 1046 may be operated, for example, by or on behalf of a cable MSO, and may be interconnected with a global system of interconnected computer networks that use the standardized Internet Protocol Suite (TCP/IP) (Transfer Control Protocol/Internet Protocol), commonly called the Internet 1002; for example, via router 1008. In one or more non-limiting exemplary embodiments, router 1008 is a point-of-presence ("POP") router; for example, of the kind available from Juniper Networks, Inc., Sunnyvale, California, USA.

Head ends 150 may each include a head end router (HER) 1091 which interfaces with network 1046. Head end routers 1091 are omitted from figures below to avoid clutter. RDC 1048 may include one or more provisioning servers (PS) 1050, one or more Video Servers (VS) 1052, one or more content servers (CS) 1054, and one or more e-mail servers (ES) 1056. The same may be interconnected to one or more RDC routers (RR) 1060 by one or more multi-layer switches (MLS) 1058. RDC routers 1060 interconnect with network 1046.

A national data center (NDC) 1098 is provided in some instances; for example, between router 1008 and Internet 1002. In one or more embodiments, such an NDC may consolidate at least some functionality from head ends and/or regional data centers. For example, such an NDC might include one or more VOD servers; switched digital video (SDV) functionality; gateways to obtain content (e.g., program content) from various sources including cable feeds and/or satellite; and so on.

Figure 2:
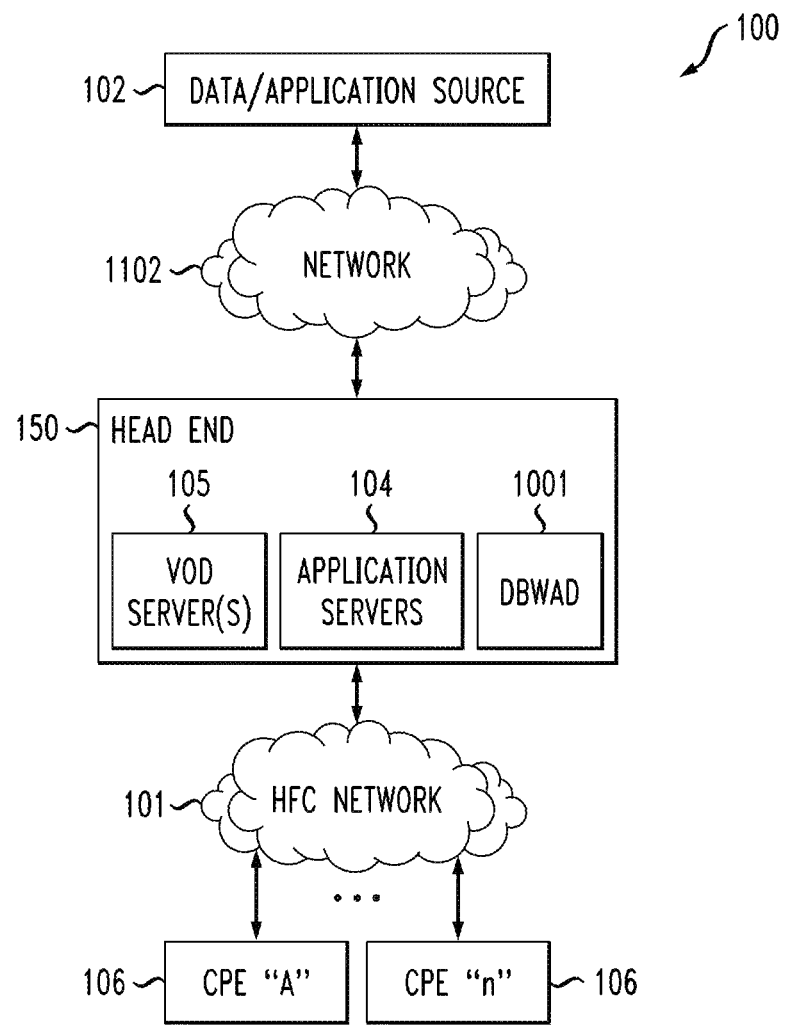
FIG. 2 is a functional block diagram illustrating an exemplary hybrid fiber-coaxial (HFC) divisional network configuration, useful within the system of FIG. 1.

FIG. 2 is a functional block diagram illustrating an exemplary content-based (e.g., hybrid fiber-coaxial (HFC)) divisional network configuration, useful within the system of FIG. 1. See, for example, US Patent Publication 2006/0130107 of Gonder et al., entitled "Method and apparatus for high bandwidth data transmission in content-based networks," the complete disclosure of which is expressly incorporated by reference herein in its entirety for all purposes. The various components of the network 100 include (i) one or more data and application origination points 102; (ii) one or more application distribution servers 104; (iii) one or more video-on-demand (VOD) servers 105, and (v) consumer premises equipment or customer premises equipment (CPE) 106. The distribution server(s) 104, VOD servers 105 and CPE(s) 106 are connected via a bearer (e.g., HFC) network 101. Servers 104, 105 can be located in head end 150. A simple architecture is shown in FIG. 2 for illustrative brevity, although it will be recognized that comparable architectures with multiple origination points, distribution servers, VOD servers, and/or CPE devices (as well as different network topologies) may be utilized consistent with embodiments of the invention. For example, the head-end architecture of FIG. 3 (described in greater detail below) may be used.

The data/application origination point 102 comprises any medium that allows data and/or applications (such as a VOD-based or "Watch TV" application) to be transferred to a distribution server 104, for example, over network 1102. This can include for example a third-party data source, application vendor web site, compact disk read-only memory (CD-ROM), external network interface, mass storage device (e.g., Redundant Arrays of Inexpensive Disks (RAID) system), etc. Such transference may be automatic, initiated upon the occurrence of one or more specified events (such as the receipt of a request packet or acknowledgement (ACK)), performed manually, or accomplished in any number of other modes readily recognized by those of ordinary skill, given the teachings herein. For example, in one or more embodiments, network 1102 may correspond to network 1046 of FIG. 1, and the data and application origination point may be, for example, within NDC 1098, RDC 1048, or on the Internet 1002. Head end 150, HFC network 101, and CPEs 106 thus represent the divisions which were represented by division head ends 150 in FIG. 1.

The application distribution server 104 comprises a computer system where such applications can enter the network system. Distribution servers per se are well known in the networking arts, and accordingly not described further herein.

The VOD server 105 comprises a computer system where on-demand content can be received from one or more of the aforementioned data sources 102 and enter the network system. These servers may generate the content locally, or alternatively act as a gateway or intermediary from a distant source.

The CPE 106 includes any equipment in the "customers' premises" (or other appropriate locations) that can be accessed by a distribution server 104 via a node 178 (discussed below with regard to FIG. 4). Non-limiting examples of CPE are set-top boxes and high-speed cable modems for providing high bandwidth Internet access in premises such as homes and businesses.

Also included (for example, in head end 150) is a dynamic bandwidth allocation device (DBWAD) 1001 such as a global session resource manager, which is itself a non-limiting example of a session resource manager.

Figure 3:
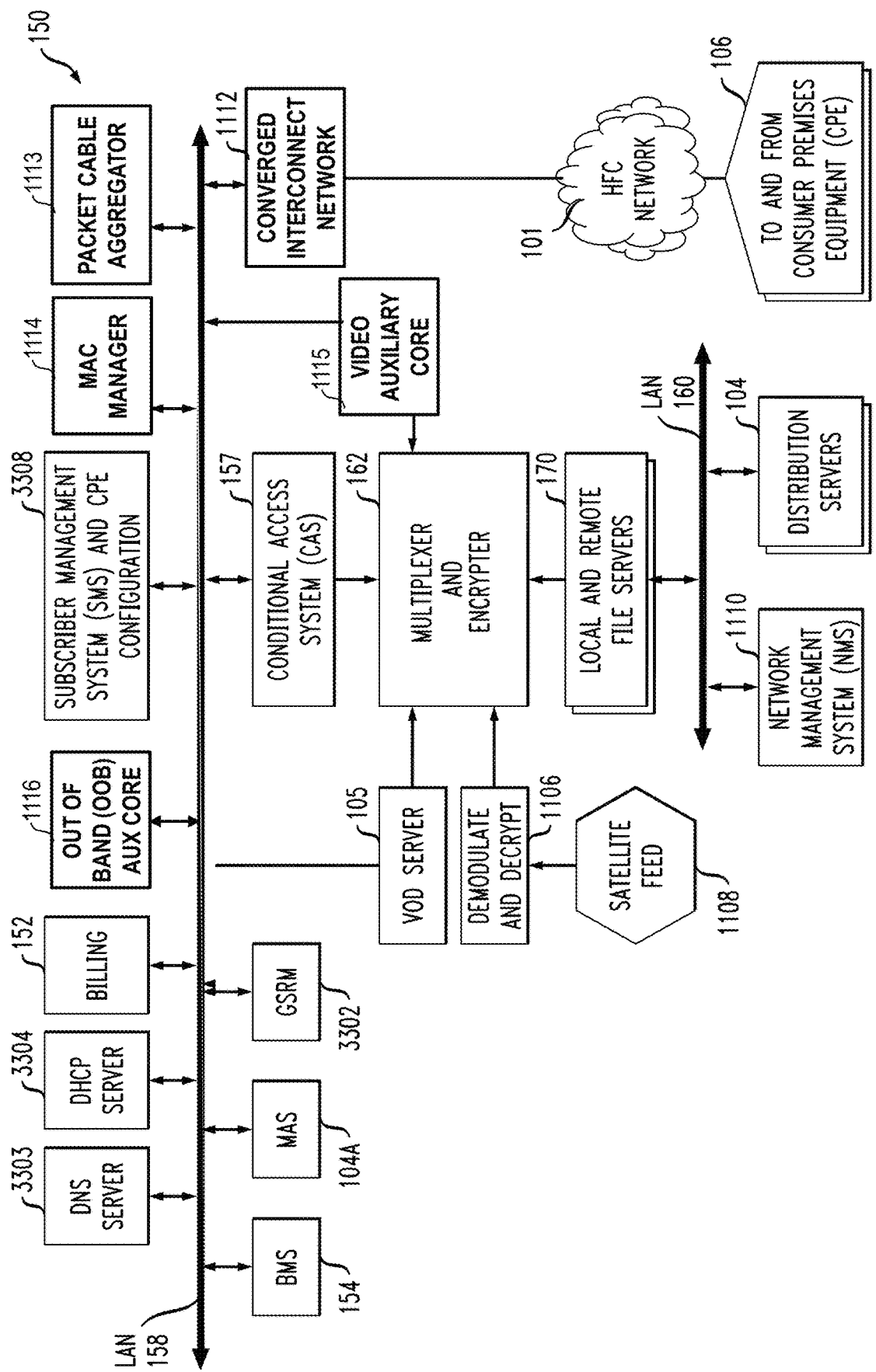
FIG. 3 is a functional block diagram illustrating one exemplary HFC cable network head-end configuration, useful within the system of FIG. 1.

FIG. 3 is a functional block diagram illustrating one exemplary HFC cable network head-end configuration, useful within the system of FIG. 1. As shown in FIG. 3, the head-end architecture 150 comprises typical head-end components and services including billing module 152, subscriber management system (SMS) and CPE configuration management module 3308, MAC Manager 1114, Packet-Cable Aggregator 1113, Video Auxiliary Core 1115, OOB Auxiliary Core 1116, as well as LAN(s) 158, 160, and the Converged Interconnect Network 1112 placing the various components in data communication with one another.

It will be appreciated that while a bar or bus LAN topology is illustrated, any number of other arrangements (e.g., ring, star, etc.) may be used consistent with the invention. It will also be appreciated that the head-end configuration depicted in FIG. 3 is high-level, conceptual architecture and that each multi-service operator (MSO) may have multiple head-ends deployed using custom architectures.

The architecture 150 of FIG. 3 further includes the CIN 1112 that is coupled to the HFC network 101 and adapted to "condition" content for transmission over the network. The distribution servers 104 are coupled to the LAN 160, which provides access to the CIN 1112 and network 101 via one or more file servers 170. The VOD servers 105 are coupled to the LAN 158, although other architectures may be employed (such as for example where the VOD servers are associated with a core switching device such as an 802.3z Gigabit Ethernet device; or the VOD servers could be coupled to LAN 160). Since information is typically carried across multiple channels, the head-end should be adapted to acquire the information for the carried channels from various sources. Typically, the channels being delivered from the head-end 150 to the CPE 106 ("downstream") are multiplexed together in the head-end and sent to neighborhood hubs (refer to description of FIG. 4) via a variety of interposed network components.

Content (e.g., traditional audio, traditional (as distinguished from IPTV) video, etc.) is provided in each downstream (in-band) channel associated with the relevant service group. (Note that in the context of data communications, interne data is passed both downstream and upstream.) To communicate with the head-end or intermediary node (e.g., hub server), the CPE 106 may use the out-of-band (OOB) or DOCSIS® (Data Over Cable Service Interface Specification) channels (registered mark of Cable Television Laboratories, Inc. ("CableLabs"), 400 Centennial Parkway Louisville CO 80027, USA) and associated protocols (e.g., DOCSIS 1.x, 2.0, 3.0, 3.1, or 4.0). The Open-Cable™ Application Platform (OCAP) 1.0, 2.0, 3.0 (and subsequent) specification (CableLabs) provides for exemplary networking protocols both downstream and upstream, although the invention is in no way limited to these approaches. All versions of the DOC SIS and OCAP specifications are expressly incorporated herein by reference in their entireties for all purposes.

Furthermore in this regard, DOCSIS is an international telecommunications standard that permits the addition of high-speed data transfer to an existing cable TV (CATV)

system. It is employed by many cable television operators to provide Internet access (cable Internet) over their existing hybrid fiber-coaxial (HFC) infrastructure. Use of DOCSIS to transmit data (including IPTV) on an HFC system is one non-limiting exemplary context associated with one or more embodiments. However, one or more embodiments are generally applicable to IPTV, regardless of what kind of functionality is employed.

It will also be recognized that multiple servers (broadcast, VOD, or otherwise) can be used, and disposed at two or more different locations if desired, such as being part of different server "farms". These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups.

In some instances, material may also be obtained from a satellite feed 1108; such material is demodulated and decrypted in block 1106 and fed to block 162. Conditional access system 157 may be provided for access control purposes. Network management system 1110 may provide appropriate management functions. Note also that signals from M/E 162 are fed to the Video Auxiliary Core in block 1115 for transmission to the Converged Interconnect Network (CIN) in block 1112.

Also included in FIG. 3 are a global session resource manager (GSRM) 3302, a Mystro Application Server (MAS) 104A, and a business management system (BMS) 154, all of which are coupled to LAN 158. GSRM 3302 is one specific form of a DBWAD 1001 and is a non-limiting example of a session resource manager.

An ISP DNS server could be located in the head-end as shown at 3303, but it can also be located in a variety of other places. One or more DHCP server(s) 3304 can also be located where shown or in different locations.

Figure 4:
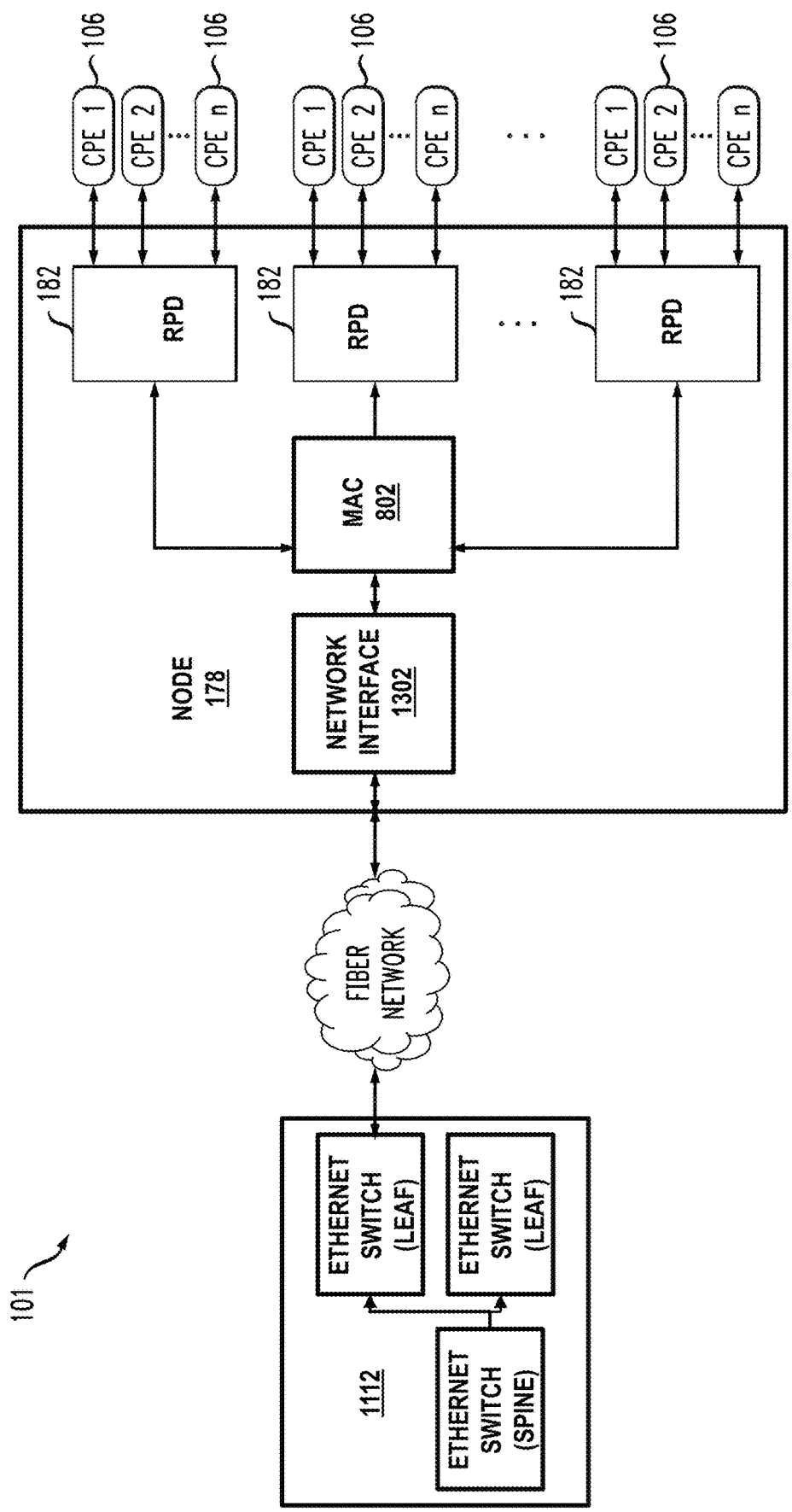
FIG. 4 is a functional block diagram illustrating one exemplary local service node configuration useful within the system of FIG. 1.

As shown in FIG. 4, the Converged Interconnect Network (CIN) of FIG. 3 is comprised of any number of Ethernet Switches. Although pictured as a Leaf-Spine network, it could be a single switch or distributed between a Master Head End and any number of Satellite Hub Sites. The purpose of the CIN network is to take the outputs of the Mac Manager, PacketCable Aggregator, Video Auxiliary Core(s), and OOB Core(s) and distribute those to the HFC Network (101) as well as aggregating the output of the HFC Network and placing it onto LAN 158. A subset of the devices on LAN 158 may also be connected directly to switch(es) in the CIN. Outputs of the CIN could be either optical ports built into the switches, optical transceivers external to the switch, pluggable optical transceivers that are inserted into the appropriate ports in the switch, or other mechanisms as applicable. Any number of Wave Division Multiplexing technologies may also be incorporated into the CIN to combine signals from multiple ports onto a single HFC fiber at the Head End.

The network 101 of FIGS. 2 and 3 comprises a fiber/coax arrangement wherein the output of the CIN of FIG. 3 is transferred to the optical domain. The optical domain signals are then distributed over a fiber network to a fiber node 178, which includes a network interface 1302 and a MAC Device 802 (further discussed with reference to FIG. 8) that further distributes the signals to a plurality of Remote PHY Devices (RPDs) 182. This provides an effective 1-to-N expansion of the network at the local service end. Each RPD 182 services a number of CPEs 106. Further reference may be had to US Patent Publication 2007/0217436 of Markley et al., entitled "Methods and apparatus for centralized content and data delivery," the complete disclosure of which is expressly incorporated herein by reference in its entirety for all purposes. In one or more embodiments, the CPE 106 includes a cable modem, such as a DOCSIS-compliant cable modem (DCCM). Please note that the number of CPE 106 per RPD 182 may be different than the number of RPDs 182.

US Patent Publication 2009-0248794 of William L. Helms, entitled "SYSTEM AND METHOD FOR CONTENT SHARING," the complete disclosure of which is expressly incorporated herein by reference for all purposes, provides additional details on CPE in the form of a converged premises gateway device. Related aspects are also disclosed in US Patent Publication 2007-0217436 of Markley et al, entitled "METHODS AND APPARATUS FOR CENTRALIZED CONTENT AND DATA DELIVERY," the complete disclosure of which is expressly incorporated herein by reference for all purposes.

Figure 5:
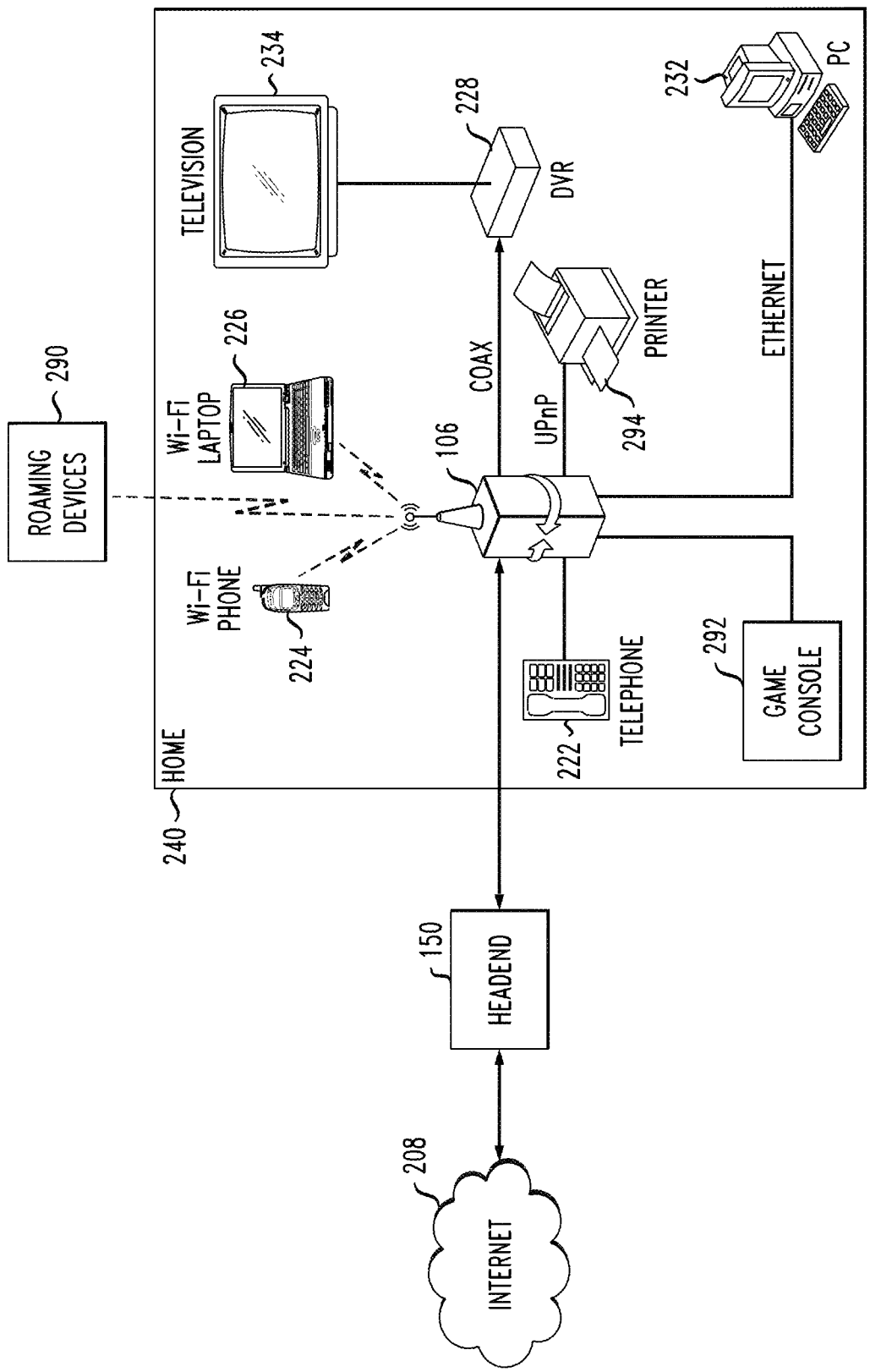
FIG. 5 is a functional block diagram of a premises network, including an exemplary centralized customer premises equipment (CPE) unit, interfacing with a head end such as that of FIG. 3.
Figure 6:
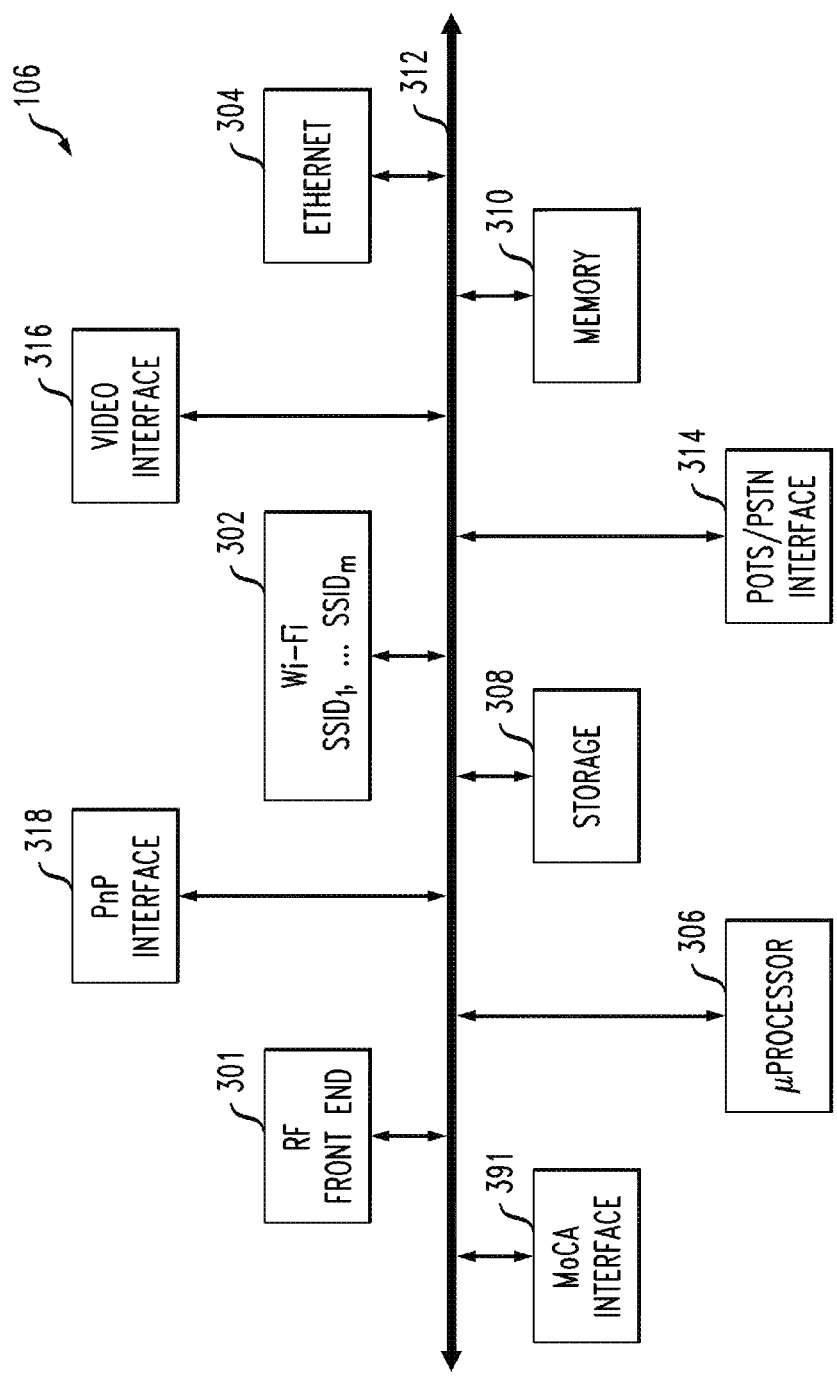
FIG. 6 is a block diagram of one exemplary embodiment of the CPE of FIG. 5.
Figure 7:
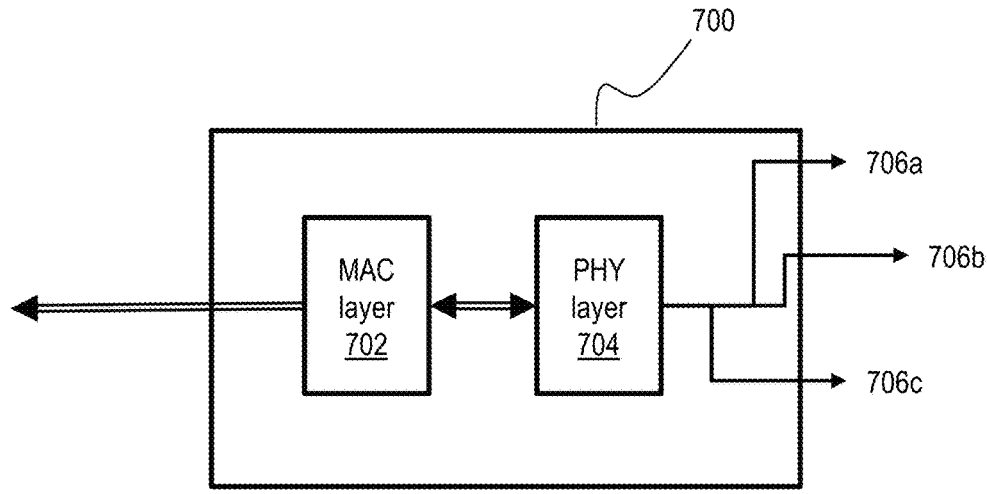
FIG. 7 illustrates a conventional remote medium access control/physical device (Remote MAC/PHY Device or RMD) chipset feeding multiple outputs, in accordance with the prior art.

Reference should now be had to FIG. 5, which presents a block diagram of a premises network interfacing with a head end of an MSO or the like, providing Internet access. An exemplary advanced wireless gateway comprising CPE 106 is depicted as well. It is to be emphasized that the specific form of CPE 106 shown in FIGS. 5 and 6 is exemplary and non-limiting, and shows a number of optional features. Many other types of CPE can be employed in one or more embodiments; for example, a cable modem, and the like.

CPE 106 includes an advanced wireless gateway which connects to a head end 150 or other hub of a network, such as a video content network of an MSO or the like. The head end is coupled also to an internet (e.g., the Internet) 208 which is located external to the head end 150, such as via an Internet (IP) backbone or gateway (not shown).

The head end is in the illustrated embodiment coupled to multiple households or other premises, including the exemplary illustrated household 240. In particular, the head end is coupled via the aforementioned HFC network and local coaxial cable or fiber drop to the premises, including the consumer premises equipment (CPE) 106. Note that historically, a cable modem termination system was typically located in the head end 150; however, in one or more embodiments this functionality is divided between Node 178, Mac Manager 1114, PacketCable Aggregator 1113, Converged Interconnect Network 1112, and optionally Video Auxiliary Core 1115 and OOB Aux Core 1116 as described in the following Flexible Mac Architecture (FMA) specifications (and any subsequent releases of these specifications from CableLabs), hereby incorporated by reference in their entirety:

CableLabs, "Data-Over-Cable Service Interface Specifications Flexible MAC Architecture FMA MAC Manager Interface Specification CM-SP-FMA-MMI-I01-200930." September 2020.

CableLabs, "Data-Over-Cable Service Interface Specifications Flexible MAC Architecture Flexible MAC Architecture (FMA) System Specification CM-SP-FMA-SYS-I01-200930." September 2020.

CableLabs, "Data-Over-Cable Service Interface Specifications Flexible MAC Architecture FMA PacketCable™ Aggregator Interface Specification CM-SP-FMA-PAI-I01-200930." September 2020.

The exemplary CPE 106 is in signal communication with any number of different devices including, e.g., a wired telephony unit 222, a Wi-Fi or other wireless-enabled phone 224, a Wi-Fi or other wireless-enabled laptop 226, a session initiation protocol (SIP) phone, an H.323 terminal or gateway, etc. Additionally, the CPE 106 is also coupled to a digital video recorder (DVR) 228 (e.g., over coax), in turn coupled to television 234 via a wired or wireless interface (e.g., cabling, PAN or 802.15 UWB micro-net, etc.). CPE 106 is also in communication with a network (here, an Ethernet network compliant with IEEE Std. 802.3, although any number of other network protocols and topologies could be used) on which is a personal computer (PC) 232.

Other non-limiting exemplary devices that CPE 106 may communicate with include a printer 294; for example, over a universal plug and play (UPnP) interface, and/or a game console 292; for example, over a multimedia over coax alliance (MoCA) interface. Game console 292 is one example of a game console that could be used to watch IPTV in accordance with aspects of the invention. However, game consoles on which one or more embodiments are to be practiced can be connected to the Internet in many ways; an HFC network providing high-speed IP data in addition to traditional video content is merely one non-limiting exemplary embodiment. Game console 292 could be connected to CPE 106 by, for example, Ethernet, Wi-Fi, or MoCA (e.g., via a MoCA-to-Ethernet bridge). All types of game consoles may not necessarily be capable of connection via all of Ethernet, Wi-Fi, and MoCA. Some embodiments employ a Microsoft Xbox console as game console 292. Furthermore, as noted, other embodiments employ alternative platforms such as the Roku box or other media streamers; the same can be connected to CPE 106 instead of or in addition to gaming console 292.

In some instances, CPE 106 is also in signal communication with one or more roaming devices, generally represented by block 290.

A "home LAN" (HLAN) is created in the exemplary embodiment, which may include for example the network formed over the installed coaxial cabling in the premises, the Wi-Fi network, and so forth.

During operation, the CPE 106 exchanges signals with the head end over the interposed coax (and/or other, e.g., fiber) bearer medium. The signals include e.g., IPTV or other Internet traffic (IPv4 or IPv6), digital programming and other digital signaling or content such as digital (packet-based; e.g., VoIP) telephone service. The CPE 106 then exchanges this digital information after demodulation and any decryption (and any demultiplexing) to the particular system(s) to which it is directed or addressed. For example, in one embodiment, a MAC address or IP address can be used as the basis of directing traffic within the client-side environment 240.

Any number of different data flows may occur within the network depicted in FIG. 5. For example, the CPE 106 may exchange digital telephone signals from the head end which are further exchanged with the telephone unit 222, the Wi-Fi phone 224, or one or more roaming devices 290. The digital telephone signals may be IP-based such as Voice-over-IP (VoIP), or may utilize another protocol or transport mechanism. The well-known session initiation protocol (SIP) may be used, for example, in the context of a "SIP phone" for making multi-media calls. The network may also interface with a cellular or other wireless system, such as for example a 3G IMS (IP multimedia subsystem) system, in order to provide multimedia calls between a user or consumer in the household domain 240 (e.g., using a SIP phone or H.323 terminal) and a mobile 3G telephone or personal media device (PMD) user via that user's radio access network (RAN).

The CPE 106 may also exchange Internet traffic (e.g., TCP/IP and other packets) with the head end 150 which is further exchanged with the Wi-Fi laptop 226, the PC 232, one or more roaming devices 290, the gaming console 292, or other device (e.g., media streamer). CPE 106 may also receive digital programming that is forwarded to the DVR 228 or to the television 234. Programming requests and other control information may be received by the CPE 106 and forwarded to the head end as well for appropriate handling.

FIG. 6 is a block diagram of one exemplary embodiment of the CPE 106 of FIG. 5. The exemplary CPE 106 includes an RF front end 301, Wi-Fi interface 302, video interface 316, "Plug n' Play" (PnP) interface 318 (for example, a UPnP interface) and Ethernet interface 304, each directly or indirectly coupled to a bus 312. In some cases, Wi-Fi interface 302 comprises a single wireless access point (WAP) running multiple ("m") service set identifiers (SSIDs). In some cases, multiple SSIDs, which could represent different applications, are served from a common WAP. For example, SSID 1 is for the home user, while SSID 2 may be for a managed security service, SSID 3 may be a managed home networking service, SSID 4 may be a hot spot, and so on. Each of these is on a separate IP subnetwork for security, accounting, and policy reasons. The microprocessor 306, storage unit 308, plain old telephone service (POTS)/public switched telephone network (PSTN) interface 314, and memory unit 310 are also coupled to the exemplary bus 312, as is a suitable MoCA interface 391. The memory unit 310 typically comprises a random-access memory (RAM) and storage unit 308 typically comprises a hard disk drive, an optical drive (e.g., CD-ROM or DVD), NAND flash memory, RAID (redundant array of inexpensive disks) configuration, or some combination thereof.

The illustrated CPE 106 can assume literally any discrete form factor, including those adapted for desktop, floor-standing, or wall-mounted use, or alternatively may be integrated in whole or part (e.g., on a common functional basis) with other devices if desired.

Again, it is to be emphasized that every embodiment need not necessarily have all the elements shown in FIG. 6—as noted, the specific form of CPE 106 shown in FIGS. 5 and 6 is exemplary and non-limiting, and shows a number of optional features. Yet again, many other types of CPE can be employed in one or more embodiments; for example, a cable modem, DSL modem, and the like.

It will be recognized that while a linear or centralized bus architecture is shown as the basis of the exemplary embodiment of FIG. 6, other bus architectures and topologies may be used. For example, a distributed or multi-stage bus architecture may be employed. Similarly, a "fabric" or other mechanism (e.g., crossbar switch, RAPIDIO interface, non-blocking matrix, TDMA or multiplexed system, etc.) may be used as the basis of at least some of the internal bus communications within the device. Furthermore, many if not all of the foregoing functions may be integrated into one or more integrated circuit (IC) devices in the form of an ASIC or "system-on-a-chip" (SoC). Myriad other architectures well known to those in the data processing and computer arts may accordingly be employed.

Yet again, it will also be recognized that the CPE configuration shown is essentially for illustrative purposes, and various other configurations of the CPE 106 are consistent with other embodiments of the invention. For example, the CPE 106 in FIG. 6 may not include all of the elements shown, and/or may include additional elements and interfaces such as for example an interface for the HomePlug A/V standard which transmits digital data over power lines, a PAN (e.g., 802.15), Bluetooth, or other short-range wireless interface for localized data communication, etc.

A suitable number of standard 10/100/1000 Base T Ethernet ports for the purpose of a Home LAN connection are provided in the exemplary device of FIG. 6; however, it will be appreciated that other rates (e.g., Gigabit Ethernet or 10-Gig-E) and local networking protocols (e.g., MoCA, USB, etc.) may be used. These interfaces may be serviced via a WLAN interface, wired RJ-45 ports, or otherwise. The CPE 106 can also include a plurality of RJ-11 ports for telephony interface, as well as a plurality of USB (e.g., USB 2.0) ports, and IEEE-1394 (Firewire) ports. S-video and other signal interfaces may also be provided if desired.

During operation of the CPE 106, software located in the storage unit 308 is run on the microprocessor 306 using the memory unit 310 (e.g., a program memory within or external to the microprocessor). The software controls the operation of the other components of the system, and provides various other functions within the CPE. Other system software/firmware may also be externally reprogrammed, such as using a download and reprogramming of the contents of the flash memory, replacement of files on the storage device or within other non-volatile storage, etc. This allows for remote reprogramming or reconfiguration of the CPE 106 by the MSO or other network agent.

The RF front end 301 of the exemplary embodiment comprises a cable modem of the type known in the art. In some cases, the CPE just includes the cable modem and omits the optional features. Content or data normally streamed over the cable modem can be received and distributed by the CPE 106, such as for example packetized video (e.g., IPTV). The digital data exchanged using RF front end 301 includes IP or other packetized protocol traffic that provides access to internet service. As is well known in cable modem technology, such data may be streamed over one or more dedicated channels, which may be modulated using Quadrature Amplitude Modulation (QAM), Orthogonal Frequency-Division Multiplexing/Orthogonal Frequency-Division Multiple Access (OFDM/OFDMA), or other known modulation schemes resident on the HFC bearer medium. It may also be multiplexed or otherwise combined with channels allocated for content delivery, etc. The packetized (e.g., IP) traffic received by the CPE 106 may then be exchanged with other digital systems in the local environment 240 (or outside this environment by way of a gateway or portal) via, e.g., the Wi-Fi interface 302, Ethernet interface 304, MoCA interface 391, or plug-and-play (PnP) interface 318. In one or more embodiments, digital lasers are used rather than analog lasers because the digital lasers require less expensive equipment.

Additionally, the RF front end 301 modulates, encrypts/multiplexes as required, and transmits digital information for receipt by upstream entities such as the RMD or a network server. This includes upstream commands from Xbox or other game console 292. In one or more embodiments, the Xbox or other game console does not communicate directly with the RF Front End 301; rather, it communicates with the RF Front End 301 over Ethernet 304 or Wi-Fi 302. Upstream commands from the Xbox or other game console 292 are sent to the RF Front End over Ethernet 304 or Wi-Fi 302 and then upstream into the network, from the RF Front End 301, via DOCSIS or the like. Digital data transmitted via the RF front end 301 may include, for example, MPEG-2 encoded programming data that is forwarded to a television monitor via the video interface 316. Programming data may also be stored on the CPE storage unit 308 for later distribution by way of the video interface 316, or using the Wi-Fi interface 302, Ethernet interface 304, Firewire (IEEE Std. 1394), USB/USB2, or any number of other such options.

Other devices such as portable music players (e.g., MP3 audio players) may be coupled to the CPE 106 via any number of different interfaces, and music and other media files downloaded for portable use and viewing.

In some instances, the CPE 106 includes a DOCSIS cable modem for delivery of traditional broadband Internet services. This connection can be shared by all Internet devices in the premises 240; e.g., Internet protocol television (IPTV) devices, PCs, laptops, etc., as well as by roaming devices 290. In addition, the CPE 106 can be remotely managed (such as from the head end 150, or another remote network agent) to support appropriate IP services.

In some instances, the CPE 106 also creates a home Local Area Network (LAN) utilizing the existing coaxial cable in the home. For example, an Ethernet-over-coax based technology allows services to be delivered to other devices in the home utilizing a frequency outside (e.g., above) the traditional cable service delivery frequencies. For example, frequencies on the order of 1150 MHz could be used to deliver data and applications to other devices in the home such as PCs, PMDs, media extenders and set-top boxes. The coaxial network is merely the bearer; devices on the network utilize Ethernet or other comparable networking protocols over this bearer.

The exemplary CPE 106 shown in FIGS. 5 and 6 acts as a Wi-Fi access point (AP), thereby allowing Wi-Fi enabled devices to connect to the home network and access Internet, media, and other resources on the network. This functionality can be omitted in one or more embodiments.

In one embodiment, Wi-Fi interface 302 comprises a single wireless access point (WAP) running multiple ("m") service set identifiers (SSIDs). One or more SSIDs can be set aside for the home network while one or more SSIDs can be set aside for roaming devices 290.

A premises gateway software management package (application) is also provided to control, configure, monitor and provision the CPE 106 from the cable head-end 150 or other remote network node via the cable modem (DOCSIS) interface. This control allows a remote user to configure and monitor the CPE 106 and home network.

The MoCA interface 391 can be configured, for example, in accordance with the MoCA 1.0, 1.1, or 2.0 specifications.

As discussed above, the optional Wi-Fi wireless interface 302 is, in some instances, also configured to provide a plurality of unique service set identifiers (SSIDs) simultaneously. These SSIDs are configurable (locally or remotely), such as via a web page.

In addition to traditional "broadcast" content (e.g., video programming), the systems of FIGS. 1-6 also deliver Internet data services (including IPTV) using the Internet protocol (IP), although other protocols and transport mechanisms of the type well known in the digital communication art may be substituted. The IP packets are typically transmitted on RF channels that are different than the RF channels used for the broadcast of traditional video and audio programming, although this is not a requirement. The CPE 106 are each configured to monitor the particular assigned RF channel (such as via a port or socket ID/address, or other such mechanism) for IP packets intended for the subscriber premises/address that they serve.

Figure 10:
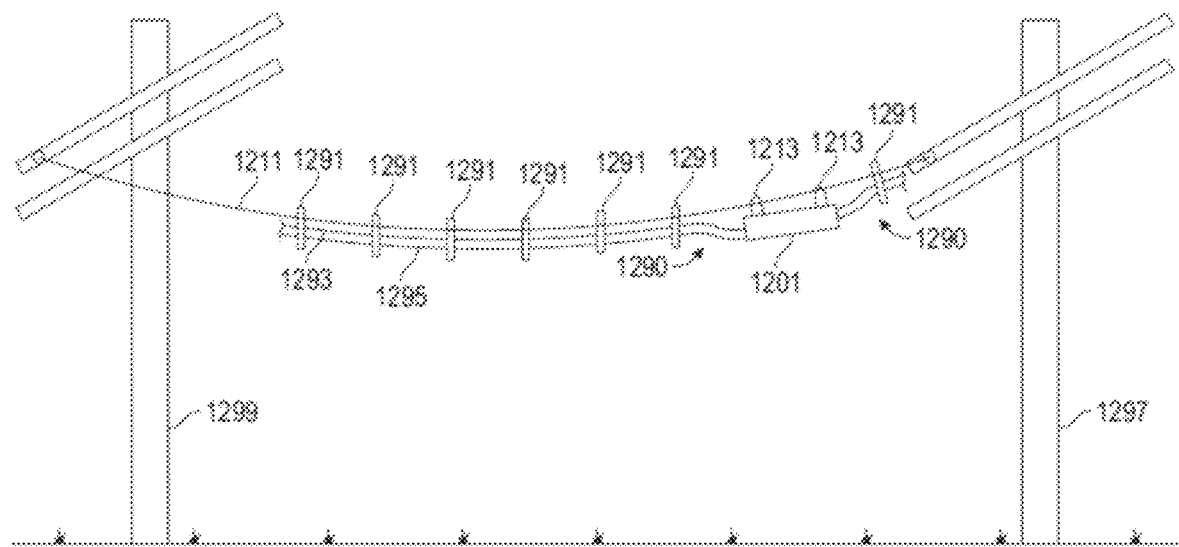
FIG. 10 shows an exemplary location.

Referring now to FIG. 10, some embodiments could be located in a node housing 1201 hung from a cable strand 1211 ("aerial strand") via clamps 1213; the strand 1211 is suspended from telephone poles 1299, 1297. Cables 1295, 1293 are mechanically fastened to strand 1211 (e.g., via wrapping and/or ties 1291) and have slack portions 1290 that connect to housing 1201. Aerial strand 1211 is structural, attached pole-to-pole, and takes tension while cables 1295, 1293 are attached to strand 1211 which supports their weight.

Figure 8:
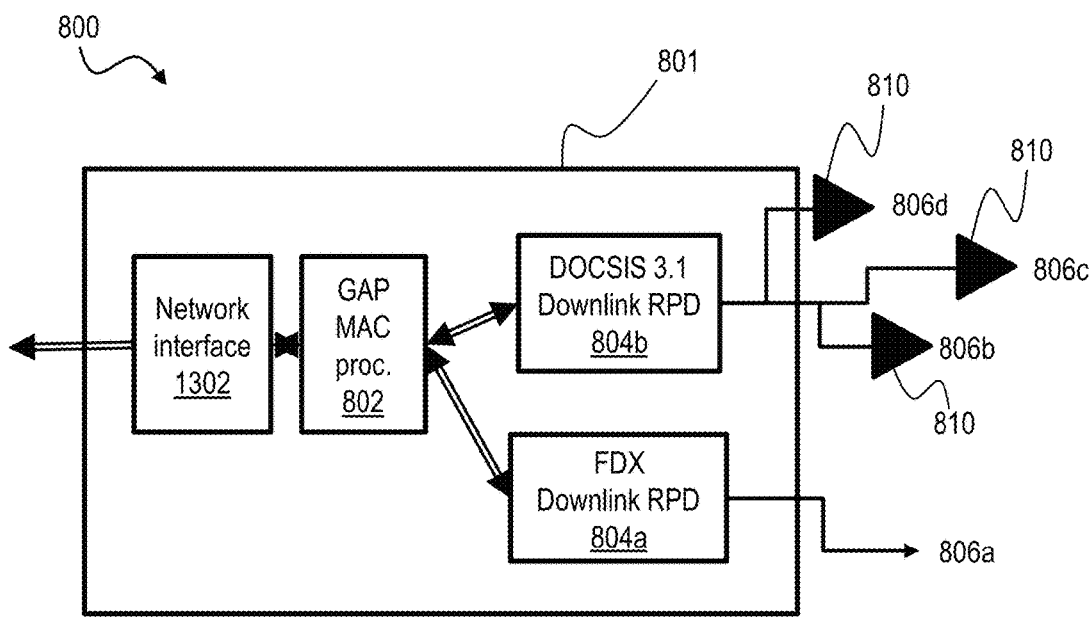
FIG. 8 illustrates a GAP housing that encloses a Local processor (single MAC device) feeding multiple Remote Physical Devices (RPDs), according to an exemplary embodiment.

In view of the foregoing, and referring to FIG. 8, aspects of the invention provide methods and a system 800 using a GAP housing 801 and associated MAC layer (local) processor 802 with multiple Remote-Phy Devices (RPDs) 804a, 804b that are mounted in the housing. At least some of the RPDs may implement different protocols than others of the RPDs or could be added to provide additional Phy layer resources within the same GAP enclosure. A network interface 1302 feeds the local processor 802.

In this regard, consider the following documents, hereby incorporated by reference in their entirety:

CableLabs, "Data-Over-Cable Service Interface Specifications DCA—MHAv2 Remote Out-of-Band Specification CM-SP-R-OOB-I12-200323." March 2020.

CableLabs, "Data-Over-Cable Service Interface Specifications DCA—MHAv2 Remote DOCSIS Timing Interface CM-SP-R-DTI-I08-200323." March 2020.

CableLabs, "Data-Over-Cable Service Interface Specifications DCA—MHAv2 Generic Control Plane Specification CM-SP-GCP-I05-200323." March 2020.

CableLabs, "Data-Over-Cable Service Interface Specifications DCA—MHAv2 Remote PHY OSS Interface Specification CM-SP-R-OSSI-I14-200421." April 2020.

CableLabs, "Data-Over-Cable Service Interface Specifications MHAv2 Remote Upstream External PHY Interface Specification CM-SP-R-UEPI-I13-201207." December 2020.

CableLabs, "Data-Over-Cable Service Interface Specifications MHAv2 Remote Downstream External PHY Interface Specification CM-SP-R-DEPI-I15-201207." December 2020.

CableLabs, "Data-Over-Cable Service Interface Specifications MHAv2 Remote PHY Specification CM-SP-R-PHY-I15-201207." December 2020.

As mentioned, the local processor 802 can be used to implement MAC layer processing. Generally, according to an exemplary embodiment, the local processor 802 is adapted to implement MAC layer processing by computer-executable instructions that are loaded into the processor's local memory from a computer readable storage medium. In one or more embodiments, one or more RPDs 804a, 804b implement the PHY layer. According to an exemplary embodiment, the RPDs are adapted to implement different PHY layer protocols by switching out the RPD hardware. MAC and PHY layers are concepts familiar to the ordinary skilled worker; generally, the MAC layer controls the timing of signals to be sent from or received by equipment, while the PHY layer generates or receives the actual signals on the physical connection. Communication between the MAC layer processing on the local processor and each RPD is via the existing Remote-Phy standards.

Implementation of the MAC layer in software, separate from hardware implementations of the PHY layer, provides multiple benefits to operators. For example, an operator can implement a uniform MAC layer implementation across its entire network regardless of which Phy layer implementation is used. Because the local processor 802 in the GAP housing 801 can typically be implemented via a common commercially-available processor (e.g., from Intel Corporation, Santa Clara, CA, USA or Arm Limited, Cambridge, UK), and because the Remote-Phy standards ensure interoperability, the choice of RPD hardware packages is not material to how the local processor 802 connects to the IP network. If a new vendor implements a better, faster, or more desirable MAC layer software, it can be deployed across the entire network by a software update to the local processor 802, without any hardware swaps or technicians travelling to replace the local processor 802.

Advantageously, upgrades to Phy layer features are accomplished in a relatively simple manner in one or more embodiments. Since the GAP housing 802 supports interchangeable hardware packages and the Remote-Phy standards ensure interoperability, technicians are able to swap any of the RPD hardware packages 804a, 804b without having to coordinate configuration changes to the MAC processor 802. Until the configuration is changed, the upgraded RPD hardware package operates identically to the original, with the enhanced features simply disabled. It is also possible for a single GAP enclosure to support multiple RPD hardware packages. Remote-Phy protocols allow one of the RPD hardware packages to use a chipset from one supplier while the other RPD hardware package uses a chipset from a different supplier without the MAC layer implementation needing to have any knowledge of the chipsets in use in the RPD hardware packages. This allows an operator to have, for example, an RPD that supports DOCSIS 4.0 FDX for a set of ports that are capable of FDX operations, while the remaining ports use an RPD that is either DOCSIS 3.1 or DOCSIS 4.0 1.8 GHz FDD compliant.

For example, FIG. 8 shows an RPD 804a that is configured for DOCSIS 4.0 FDX and an RPD 804b that is configured for DOCSIS 3.1. RPD 804a drives a single output 806a from the GAP housing; RPD 804b drives three outputs 806b, 806c, 806d from the GAP housing. The outputs 806b, 806c, 806d have signal amplifiers/repeaters 810 (in one or more embodiments, located outside the node housing between output port and the premises). It would not be possible to use a signal amplifier outside the node housing on the single output 806a because DOCSIS 4.0 FDX is not compatible with amplifiers. Thus, in a conventional node with a combined RMD, the network operator would have to choose whether to use DOCSIS 4.0 FDX or to use a signal amplifier. On the other hand, according to an exemplary embodiment, DOCSIS 4.0 FDX can be used for one output while an amplifier can advantageously be used for another output.

It is worth noting that using the R-Phy protocol, with the PCIe bus, one could, in theory, put in more than one RPD, thereby obtaining four simultaneous service groups, as long as power (heat dissipation) problems can be overcome. However, the power problems may be significant. In one or more embodiments, by separating the MAC layer and the Phy layer, advantageously, it is possible to more easily upgrade the Phy layer. For example, suppose it is desired to go from DOCSIS 3.1 to DOCSIS 4.0, but only on one particular leg. A DOCSIS 4.0 RPD hardware package can be added and it will still appear as one node to the head end, but there will be multiple Phy layer features that can actually be implemented at the same time in the same node, just on different parts of the plant (e.g., FDX and DOCSIS 3.1 or DOCSIS 3.1 and DOCSIS 4.0.).

Figure 11:
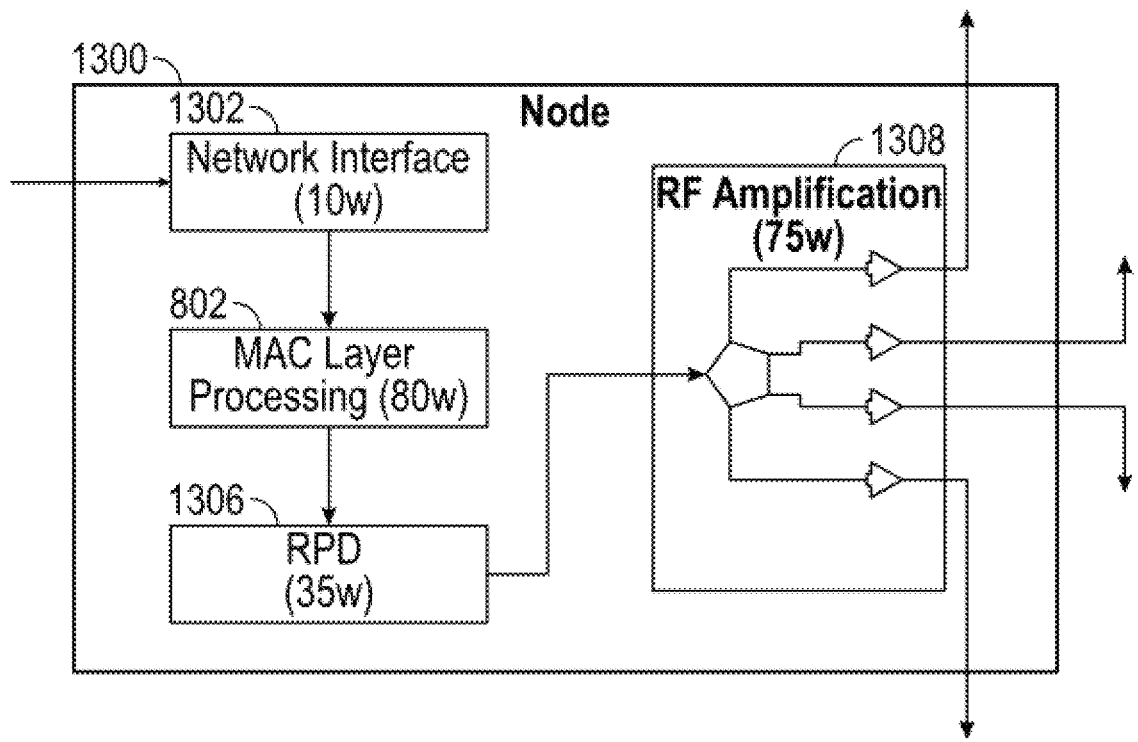
FIG. 11 illustrates a GAP housing that encloses a network interface, a Remote MAC device, a Remote PHY Device, and a 75 W amplifier unit.
Figure 12:
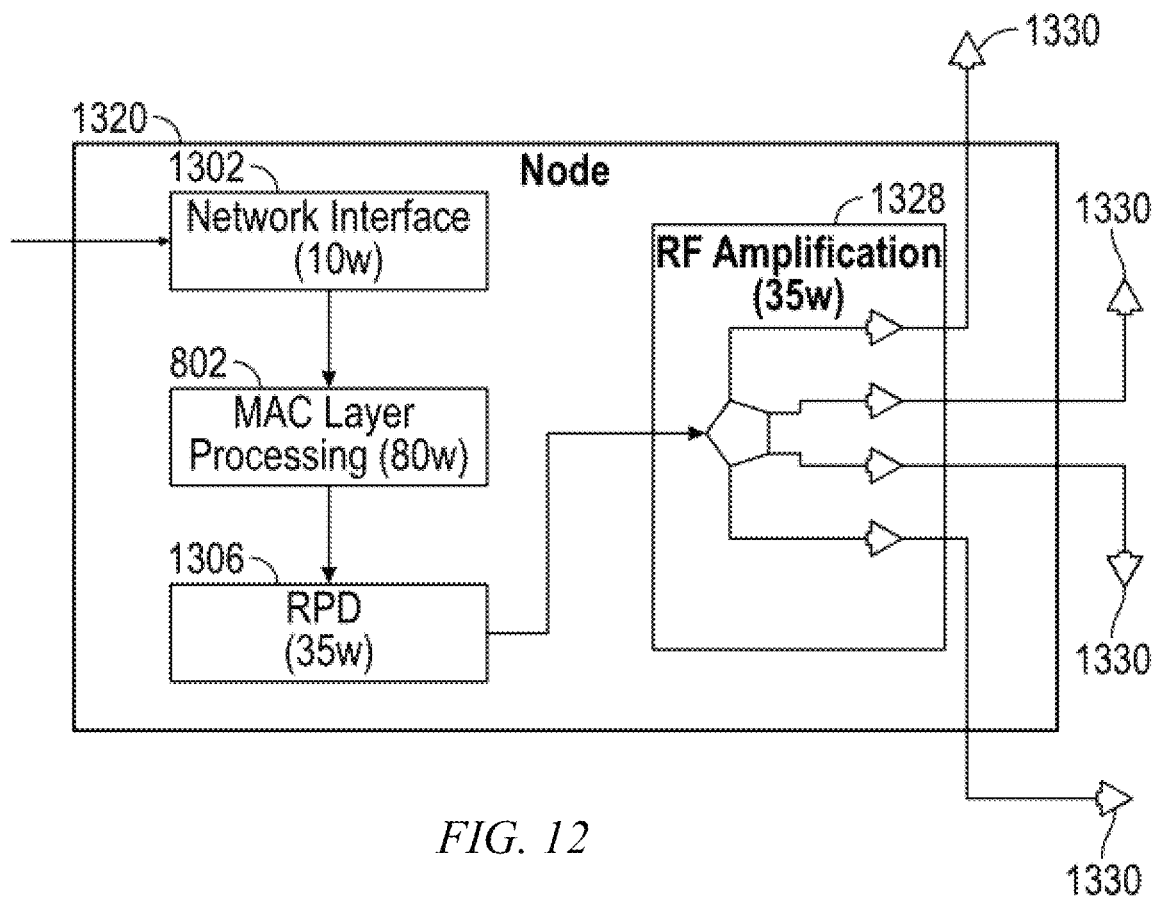
FIG. 12 illustrates a GAP housing that encloses a network interface, a Remote MAC device, a Remote PHY Device, and a 35 W amplifier unit with four 10 W amplifier units outside the housing.

Noting that power (heat dissipation) problems may arise with multiple RPDs in a single GAP housing, these problems can be alleviated by, for example, reducing or eliminating in-housing amplification of the RPD output. Reducing the power of in-housing amplification enables provisioning additional RPDs within the housing and drives positioning of outside booster amps closer to the housing. Considering a standard design value of about 200 W maximum power dissipation per GAP housing, compare FIG. 11 (node 1300 housing network interface 1302, local processor 802, RPD 1306, and conventional 75 W in-housing amplifier 1308) to FIG. 12 (node 1320 housing network interface 1302, local processor 802, RPD 1306, and proposed 35 W in-housing amplifier 1328, with external 10 W amplifiers 1330) or FIG. 8 (node 801 housing network interface 1302, local processor 802, first RPD 804*a*, second RPD 804*b*, no in-housing amplifier, and external 25 W amplifiers 810). Advantageously, designs with less amplifying power inside the GAP housing have room to dissipate heat from additional RPDs. Equalization still can be accomplished inside the GAP housing 801.

It will thus be appreciated that one or more embodiments have a single MAC processor 802 with two or more RPDs 804*a*, 804*b* on separate chips, all housed within a GAP housing 801.

Given the foregoing detailed description and the accompanying drawings, it will be appreciated that according to an aspect of the invention, a method for operating a network communication node 800 includes enclosing a local processor 802, a first remote physical device (RPD) 804*a*, and a second RPD 804*b* within a generic access platform (GAP) node housing 801 of the network communication node. As discussed above, a GAP node housing typically has standard mounting mechanisms and standard interfaces so a wide range of hardware packages can be interchangeably used within the housing. There is a PCI Express (PCIe) bus backplane to interconnect hardware packages and there is also an option for a local processor mounted to the backplane. The hardware packages in the GAP may connect, for example, to the coaxial portion of an HFC network. The exemplary method also includes the local processor receiving a first signal on a logic link control (LLC) layer from a head end receiver outside the node housing and transforming the first signal to a second signal on a medium access control (MAC) layer; the local processor forwarding the second signal to the first RPD, which is adapted to implement on a physical (PHY) layer a first communication protocol; and the local processor forwarding the second signal to the second RPD, which is adapted to implement on the PHY layer a second communication protocol that is different than the first communication protocol.

In one or more embodiments, the method also includes the first RPD forming a third signal on the PHY layer by modifying the second signal according to the first communication protocol; the first RPD forwarding the third signal from the node housing to first consumer premises equipment (CPE) without an intervening amplifier; the second RPD forming a fourth signal on the PHY layer by modifying the second signal according to the second communication protocol, wherein the fourth signal is different than the third signal; and the second RPD forwarding the fourth signal from the node housing to second CPE via an amplifier.

In one or more embodiments, at least one of the first and second CPEs includes a plurality of set top boxes (STBs).

In one or more embodiments, the third signal is compliant with DOCSIS 4.0 FDX specification. In one or more embodiments, the fourth signal is compliant with one of DOCSIS 3.0, DOCSIS 3.1, and DOCSIS 4.0 FDD specifications.

According to another aspect, a network communication node apparatus 800 includes a generic access platform (GAP) node housing 801; a local processor 802 that is enclosed in the node housing and adapted to receive a first signal on a logical link control (LLC) layer and to convert the first signal to a second signal on a medium access control (MAC) layer; a first remote physical device (RPD) 804*a* that is enclosed in the node housing, connected in communication with the local processor to receive the second signal on the MAC layer, and adapted to implement a first communication protocol that converts the second signal to a third signal on a physical (PHY) layer; and a second RPD 804*b* that is enclosed in the node housing, connected in communication with the local processor to receive the second signal on the MAC layer, and adapted to implement a second communication protocol that is different than the first communication protocol and converts the second signal to a fourth signal on the PHY layer.

In one or more embodiments, the apparatus also includes a network interface 1302 that is enclosed in the node housing, wherein the network interface provides the first signal to the local processor; an input line connected between a head end and the network interface; a first output line connected between the first RPD and first consumer premises equipment (CPE) without an amplifier; a second output line connected between the second RPD and second CPE; and an amplifier 810 in the second output line outside the node housing.

In one or more embodiments, the first communication protocol is compliant with DOCSIS 4.0 FDX specification. In one or more embodiments, the second communication protocol is compliant with one of DOCSIS 3.0, DOCSIS 3.1, and DOCSIS 4.0 FDD specifications.

In one or more embodiments, the amplifier outside the node housing is at least a 25 watt (W) power amplifier. In one or more embodiments, the second output line includes an amplifier of no more than 10 W power inside the node housing and an amplifier of at least 25 W power outside the node housing.

In one or more embodiments, utilizing a lower power amplifier in any RF Module inside the node would generate less heat, thereby creating a condition where the total heat dissipation capabilities of the GAP enclosure would be sufficient to support additional RPD modules.

In one or more embodiments, the local processor is adapted by loading computer executable instructions from a computer readable storage medium while the first and second RPDs are adapted by hardware modifications.

In one or more embodiments, at least one of the first and second RPDs incorporates a field programmable gate array (FPGA).

One can implement the RMD using (i) FPGA, (ii) ASIC, (iii) generic processor—(iii) uses most power, then FPGA, then ASIC uses least power. One can implement the RPDs using FPGA or ASIC.

In one or more embodiments, the fourth signal is different than the third signal.

According to another aspect, a method for upgrading a network communications node includes retaining a local processor 802 in a generic access platform (GAP) node housing 801, wherein the local processor is adapted by software to receive a first signal on a logical link control (LLC) layer and to convert the first signal to a second signal on a medium access control (MAC) layer; retaining a first remote physical device (RPD) 804*a* in the node housing, wherein the first RPD is connected in communication with the local processor to receive the second signal on the MAC layer, and is adapted to implement a first communication protocol that converts the second signal to a third signal on a physical (PHY) layer; sending the second signal from the local processor to the first RPD on the MAC layer; removing a second RPD 804b from the node housing, wherein the second RPD was connected in communication with the local processor to receive the second signal on the MAC layer, and was adapted to implement a second communication protocol that was different than the first communication protocol and converted the second signal to a fourth signal on the PHY layer; replacing a third RPD for the second RPD, wherein the third RPD becomes connected in communication with the local processor to receive the second signal on the MAC layer, and is adapted to implement a third communication protocol that is different than the second communication protocol and converts the second signal to a fifth signal on the PHY layer; and sending the second signal from the local processor to the third RPD on the MAC layer.

In one or more embodiments, the method also includes sending the third signal from the first RPD to first consumer premises equipment (CPE) on the PHY layer, via a first output connection without an amplifier; and sending the fifth signal from the third RPD to second CPE on the PHY layer, via a second output connection including an amplifier.

In one or more embodiments, the second output connection includes an amplifier of at least 25 watts (W) power disposed outside the node housing. In one or more embodiments, the second output connection includes an amplifier of no more than 10 W power disposed inside the node housing.

In one or more embodiments, at least one of the first CPE and the second CPE includes multiple set top boxes (STBs).

In one or more embodiments, the method also includes modifying the local processor by a software patch so that the local processor becomes adapted to receive a sixth signal on the LLC layer and convert it to the second signal on the MAC layer.

System and Article of Manufacture Details

The invention can employ, for example, a combination of hardware and software aspects. Software includes but is not limited to firmware, resident software, microcode, etc. One or more embodiments of the invention or elements thereof can be implemented in the form of an article of manufacture including a machine readable medium that contains one or more programs which when executed implement such step(s); that is to say, a computer program product including a tangible computer readable recordable storage medium (or multiple such media) with computer usable program code configured to implement the method steps indicated, when run on one or more processors. Furthermore, some aspects of one or more embodiments of the invention or elements thereof can be implemented in the form of an apparatus including a memory and at least one processor that is coupled to the memory and operative to perform, or facilitate performance of, exemplary method steps.

Figure 9:
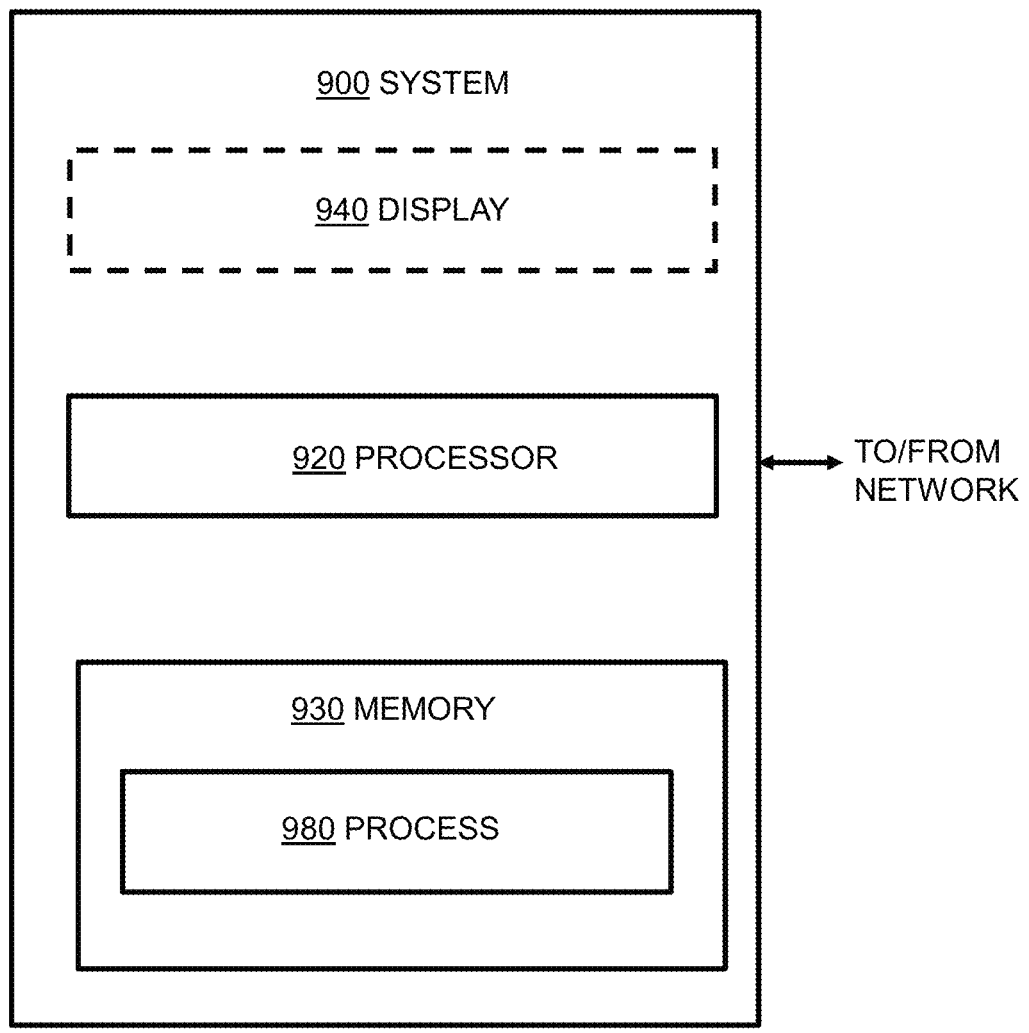
FIG. 9 illustrates an exemplary computer system.

FIG. 9 is a block diagram of a system 900 that can implement, e.g., servers shown in the other figures, and that also is generally descriptive for processors implementing program instructions. The skilled artisan will appreciate that the system could be implemented as a stand-alone server. As shown in FIG. 9, memory 930 configures the processor 920 to implement one or more methods, steps, and functions (collectively, shown as process 980 in FIG. 9). The memory 930 could be distributed or local and the processor 920 could be distributed or singular. Different steps could be carried out by different processors.

The memory 930 could be implemented as an electrical, magnetic or optical memory, or any combination of these or other types of storage devices. It should be noted that if distributed processors are employed, each distributed processor that makes up processor 920 generally contains its own addressable memory space. It should also be noted that some or all of computer system 900 can be incorporated into an application-specific or general-use integrated circuit. For example, one or more method steps could be implemented in hardware in an ASIC or via a field-programmable gate array (FPGA) rather than using firmware. Display 940 is representative of a variety of possible input/output devices (e.g., keyboards, mice, and the like). Every processor may not have a display, keyboard, mouse or the like associated with it.

As is known in the art, part or all of one or more aspects of the methods and apparatus discussed herein may be distributed as an article of manufacture that itself includes a tangible computer readable recordable storage medium having computer readable code means embodied thereon. The computer readable program code means is operable, in conjunction with a computer system, to carry out all or some of the steps to perform the methods or create the apparatuses discussed herein. A computer readable medium may, in general, be a recordable medium (e.g., floppy disks, hard drives, compact disks, EEPROMs, or memory cards) or may be a transmission medium (e.g., a network including fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk. The medium can be distributed on multiple physical devices (or over multiple networks). As used herein, a tangible computer-readable recordable storage medium is defined to encompass a recordable medium, examples of which are set forth above, but is defined not to encompass a transmission medium or disembodied signal.

The computer systems and servers and other pertinent elements described herein each typically contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Accordingly, it will be appreciated that one or more embodiments of the present invention can include a computer program product comprising computer program code means adapted to perform one or all of the steps of any methods or claims set forth herein when such program is run, for example, on a suitable processor, and that such program may be embodied on a tangible computer readable recordable storage medium. As used herein, including the claims, unless it is unambiguously apparent from the context that only server software is being referred to, a "server" includes a physical data processing system (for example, system 900 as shown in FIG. 9) running one or more server programs. It will be understood that such a physical server may or may not include a display, keyboard, or other input/output components. Furthermore, as used herein, including the claims, a "router" includes a networking device with both software and hardware tailored to the tasks of routing and forwarding information.

Furthermore, it should be noted that any of the methods described herein can include an additional step of providing a system comprising distinct software modules embodied on one or more tangible computer readable storage media. All the modules (or any subset thereof) can be on the same medium, or each can be on a different medium, for example. The modules can include any or all of the components shown in the figures. The method steps can then be carried out using the distinct software modules of the system, as described above, executing on one or more hardware processors. Further, a computer program product can include a tangible computer-readable recordable storage medium with code adapted to be executed to carry out one or more method steps described herein, including the provision of the system with the distinct software modules.

Accordingly, it will be appreciated that one or more embodiments of the invention can include a computer program including computer program code means adapted to perform certain functions as set forth herein when such program is implemented on a processor, and that such program may be embodied on a tangible computer readable recordable storage medium. Further, one or more embodiments of the present invention can include a processor including code adapted to cause the processor to carry out one or more steps of methods or claims set forth herein, together with one or more apparatus elements or features as depicted and described herein.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for operating a network communication node, the method comprising:
    enclosing a local processor, a first remote physical device (RPD) implemented on a first chip, and a second RPD, implemented on a second chip, separate from the first chip, within a generic access platform (GAP) node housing of the network communication node, by mounting the first chip and the second chip to at least one backplane within the node housing;
    the local processor receiving a first signal on a logic link control (LLC) layer from a head end receiver outside the node housing;
    the local processor transforming the first signal to a second signal at a medium access control (MAC) layer;
    the local processor forwarding the second signal to the first RPD, which is adapted to implement at a physical (PHY) layer a first communication protocol;
    the local processor forwarding the second signal to the second RPD, which is adapted to implement at the PHY layer a second communication protocol that is different than the first communication protocol;
    the first RPD forming a third signal on the PHY layer by modifying the second signal according to the first communication protocol, wherein the third signal is compliant with DOCSIS 4.0 FDX specification;
    the first RPD forwarding the third signal from the node housing to first consumer premises equipment (CPE) without an intervening amplifier;
    the second RPD forming a fourth signal on the PHY layer by modifying the second signal according to the second communication protocol, wherein the fourth signal is different than the third signal, wherein the fourth signal is compliant with one of DOCSIS 3.0, DOCSIS 3.1, and DOCSIS 4.0 FDD specifications;
    the second RPD forwarding the fourth signal from the node housing to second CPE via an amplifier; and
    hanging the node housing from a cable strand that is suspended from telephone poles.

2. The method of claim 1 wherein forwarding the third signal comprises forwarding the third signal to a first plurality of set top boxes (STBs) that comprise the first CPE.

3. The method of claim 1, further connecting a computer-readable storage medium in communication with the local processor and providing computer executable instructions to the local processor, which when implemented by the local processor configure the local processor to receive the first signal and to convert the first signal to the second signal.

4. A network communication node apparatus comprising:
    a generic access platform (GAP) node housing;
    a local processor that is enclosed in the node housing and configured by computer-executable instructions to be adapted to receive a first signal on a logical link control (LLC) layer and to convert the first signal to a second signal on a medium access control (MAC) layer;
    a first remote physical device (RPD) that is enclosed in the node housing and implemented on a first chip, connected in communication with the local processor to receive the second signal on the MAC layer, and adapted to implement a first communication protocol that converts the second signal to a third signal on a physical (PHY) layer, wherein the third signal is compliant with DOCSIS 4.0 FDX specification;
    a second RPD that is enclosed in the node housing and implemented on a second chip, separate from the first chip, connected in communication with the local processor to receive the second signal on the MAC layer, and adapted to implement a second communication protocol that is different than the first communication protocol and converts the second signal to a fourth signal on the PHY layer, wherein the fourth signal is compliant with one of DOCSIS 3.0, DOCSIS 3.1, and DOCSIS 4.0 FDD specifications; and
    at least one backplane within the node housing, the first and second chips being mounted to the at least one backplane;
    a network interface enclosed in the node housing, wherein the network interface provides the first signal to the local processor;
    an input line connected between a head end and the network interface;
    a first output line connected between the first RPD and first consumer premises equipment (CPE) without an amplifier;
    a second output line connected between the second RPD and second CPE;
    an amplifier in the second output line outside the node housing; and
    clamps hanging the node housing from a cable strand that is suspended from telephone poles.

5. The apparatus of claim 4 wherein the amplifier outside the node housing is at least a 25 watt (W) power amplifier.

6. The apparatus of claim 4 wherein the amplifier in the second output line outside the node housing is of at least 25 W power and the second output line includes an amplifier of no more than 10 W power inside the node housing.

7. The apparatus of claim 4 further comprising a computer-readable storage medium connected in communication with the local processor and storing computer executable instructions, which when implemented by the local processor configure the local processor to receive the first signal and to convert the first signal to the second signal.

8. The apparatus of claim 7 wherein at least one of the first and second RPDs incorporates a field programmable gate array (FPGA).

9. The apparatus of claim 4 wherein the fourth signal is different than the third signal.

10. A method for upgrading a network communications node, comprising:
   retaining a local processor in a generic access platform (GAP) node housing, wherein the local processor is adapted by software to receive a first signal on a logical link control (LLC) layer and to convert the first signal to a second signal on a medium access control (MAC) layer;
   retaining a first remote physical device (RPD) in the node housing, wherein the first RPD is connected in communication with the local processor to receive the second signal on the MAC layer, and is adapted to implement a first communication protocol that converts the second signal to a third signal on a physical (PHY) layer;
   sending the second signal from the local processor to the first RPD on the MAC layer;
   removing a second RPD from the node housing, wherein the second RPD was connected in communication with the local processor to receive the second signal on the MAC layer, and was adapted to implement a second communication protocol that was different than the first communication protocol and converted the second signal to a fourth signal on the PHY layer;
   replacing a third RPD for the second RPD, wherein the third RPD becomes connected in communication with the local processor to receive the second signal on the MAC layer, and is adapted to implement a third communication protocol that is different than the second communication protocol and converts the second signal to a fifth signal on the PHY layer; and
   sending the second signal from the local processor to the third RPD on the MAC layer.

11. The method of claim 10 further comprising:
   sending the third signal from the first RPD to first consumer premises equipment (CPE) on the PHY layer, via a first output connection without an amplifier; and
   sending the fifth signal from the third RPD to second CPE on the PHY layer, via a second output connection including an amplifier.

12. The method of claim 11 wherein the amplifier is of at least 25 watts (W) power and disposed outside the node housing.

13. The method of claim 12 further comprising connecting the second output connection through an additional amplifier of no more than 10 W power disposed inside the node housing.

14. The method of claim 11 further comprising sending the third signal from the first RPD to a first plurality of set top boxes (STBs) that comprise the first CPE.

15. The method of claim 10, further comprising modifying the local processor by a software patch so that the local processor becomes adapted to receive a sixth signal on the LLC layer and convert it to the second signal on the MAC layer.

* * * * *